(12) United States Patent
Franke et al.

(10) Patent No.: US 12,398,995 B2
(45) Date of Patent: Aug. 26, 2025

(54) MEASURING DEVICE FOR DETERMINING A DISTRIBUTION OF A HEAT TRANSFER MEDIUM AND METHOD FOR DETERMINING A DISTRIBUTION OF A HEAT TRANSFER MEDIUM

(71) Applicant: Deutsches Zentrum für Luft- und Raumfahrt e.V., Stuttgart (DE)

(72) Inventors: Austin Franke, Stuttgart (DE); Anja Raab, Stuttgart (DE); Alexander Hirt, Villingen-Schwenningen (DE)

(73) Assignee: Deutsches Zentrum für Luft- und Raumfahrt e.V., Stuttgart (DE)

( * ) Notice: Subject to any disclaimer, the term of this patent is extended or adjusted under 35 U.S.C. 154(b) by 208 days.

(21) Appl. No.: 18/374,124

(22) Filed: Sep. 28, 2023

(65) Prior Publication Data
US 2024/0142222 A1 May 2, 2024

(30) Foreign Application Priority Data
Oct. 26, 2022 (DE) .................. 10 2022 128 410.7

(51) Int. Cl.
*G01B 11/06* (2006.01)
*G01B 11/25* (2006.01)
*F24S 70/20* (2018.01)

(52) U.S. Cl.
CPC ...... *G01B 11/0616* (2013.01); *G01B 11/2522* (2013.01); *F24S 70/20* (2018.05)

(58) Field of Classification Search
CPC ........ G01B 11/00; G01B 17/02; G01B 17/06; G01B 11/06; G01B 11/0675; G01B 2290/25; G01B 9/02018; G01B 9/02021; G01B 9/02025; G01B 9/02031;
(Continued)

(56) References Cited

U.S. PATENT DOCUMENTS

2006/0176490 A1* 8/2006 Suzuki .................. G01K 11/00
356/479

FOREIGN PATENT DOCUMENTS

| CA | 2544306 A1 * | 6/2005 | |
| CN | 113899203 A * | 1/2022 | ............ G06F 30/20 |
| EP | 2431734 A1 | 3/2012 | |

(Continued)

OTHER PUBLICATIONS

German Official Action (Dec. 15, 2023) for corresponding German App. 10 2022 128 410.7.

*Primary Examiner* — Michael P Stafira
(74) *Attorney, Agent, or Firm* — WRB-IP PLLC

(57) ABSTRACT

A measuring device for determining a distribution of a heat transfer medium on an inner wall of a shaftless container which rotates when used to heat the heat transfer medium with concentrated solar radiation in a solar thermal power plant or as a rotary kiln includes a distance measuring device for determining a thickness of a film of the heat transfer medium on the inner wall of the container. The distance measuring device includes at least one optical device for detecting at least one height profile along at least one measurement line projected onto the inner wall and at least one position transducer for determining a current rotational position of the respective measurement line on the inner wall. A method for determining a distribution of a heat transfer medium on an inner wall of a shaftless container is also provided.

21 Claims, 10 Drawing Sheets

(58) Field of Classification Search
CPC ...... G01B 9/0209; F24S 70/20; F24S 70/225; F24S 70/25
See application file for complete search history.

(56) References Cited

FOREIGN PATENT DOCUMENTS

| | | | |
|---|---|---|---|
| EP | 3892956 A1 * | 10/2021 | ........... G01S 7/4817 |
| JP | 2018009807 A | 1/2018 | |

* cited by examiner

MEASURING DEVICE FOR DETERMINING A DISTRIBUTION OF A HEAT TRANSFER MEDIUM AND METHOD FOR DETERMINING A DISTRIBUTION OF A HEAT TRANSFER MEDIUM

BACKGROUND AND SUMMARY

The invention relates to a measuring device for determining a distribution of a beat transfer medium in a receiver device for solar radiation in a solar thermal power plant and to a method for determining a distribution of a heat transfer medium.

DE 102010062367 A1 describes a device for receiving solar radiation. The device comprises a container with an inner wall and a rotational drive device, by which the container is rotated about an axis of rotation. The container has an axis which is oriented parallel or at an acute angle to the direction of gravity. A heat transfer medium is guided through the container along the inner wall to form a heat transfer medium film. Particles or a liquid, for example, are proposed as the heat transfer medium in DE 102010062367 A1.

In experiments with the device described, there were indications of an inhomogeneous distribution of the film and thus of the heat transfer medium on the inner wall of the device. A possible reason for this can be that the surface of the inner wall of the container can change during operation due to the high thermal load of solar radiation and thermal cycles between times with solar radiation and times without solar radiation, so that a homogeneous distribution of the film may no longer be given.

In order to recognize this, a simulation of the film thickness of the heat transfer medium is usually carried out, which however involves many simplifications and assumptions that are not fully validated.

It is desirable to create a measuring device for determining a distribution of a heat transfer medium in a receiver device for solar radiation in a solar thermal power plant, which provides meaningful data.

It is also desirable to specify methods for determining a distribution of a heat transfer medium using such a measuring device.

A measuring device is proposed for determining the distribution of a heat transfer medium on an inner wall of a shaftless container that rotates when used as intended, which is provided in particular to heat the heat transfer medium with concentrated solar radiation in a solar thermal power plant or as a rotational kiln. The measuring device includes a distance measuring device for determining a thickness of a film of the heat transfer medium on the inner wall of the container. The distance measuring device comprises at least one optical device for detecting at least one height profile along at least one measurement line projected onto the inner wall and at least one position transducer for determining a current rotational position of the respective measurement line on the inner wall relative to a rotational position of the container.

The container is in particular a so-called particle receiver in a solar thermal power plant. In a particle receiver, solar rays are concentrated in the interior and a particulate heat transfer medium is heated, the particles of which are distributed along the inner wall of the particle receiver when the particle receiver is rotated. The particles form a particle film essentially parallel to the inner wall of the particle receiver. The particle film moves from an inlet into the particle receiver to an outlet from the particle receiver.

The film thickness can advantageously be measured. A possibly incorrect calculation or simulation of the film thickness can be omitted. The film thickness can not only be assessed qualitatively, whether there are gaps in the film, for example, but a reliable statement can be made about the film thickness on the inner wall of the container in the measured region.

The measuring device is particularly suitable for so-called centrifugal receivers, also known as particle receivers, in receiver devices for solar radiation in solar thermal power plants and for rotational kilns.

According to an advantageous configuration of the measuring device, the distance measuring device can be designed to detect distance data directly on the inner wall of the container along the measurement line in order to create the height profile.

A statement about the height profile on the entire surface of the inner wall or on regions of the inner wall that are of interest can be obtained if, for example, a large number of measurement lines lying next to one another are detected one after the other. The container can expediently be set in rotation for this purpose, so that a region or the entire surface of the inner wall can be measured.

According to an advantageous configuration of the measuring device, the distance measuring device can be designed to detect distance data directly on the film of the heat transfer medium on the inner wall of the container along the measurement line in order to create the height profile.

A statement about the height profile on the entire surface of the inner wall or on regions of the inner wall that are of interest can be obtained if, for example, a large number of measurement lines lying next to one another are detected one after the other. The container can expediently rotated for this purpose, so that a region or the entire surface of the inner wall can be measured.

A light section can advantageously be used to detect the height profile. The light section is a known method of optical 3D measurement technology, with which a height profile can be measured along a projected line of light and is based on the principle of triangulation. The optical device can in particular be a light section sensor, which includes a line projector, usually with a laser as the light source, which projects a line that is as narrow and bright as possible onto the measurement object, and an electronic camera, which detects the projection of the measurement line on the object, in this case the clean inner wall or the film on the inner wall. The displacement of the measurement line in the camera image can be converted into 3-D coordinates using the methods of photogrammetry that are known per se. Measuring devices that use this method are known, for example, as so-called profile scanners.

Profile scanners measure a height profile along a projected line of light, which represents the measurement line. The distance is not measured continuously. There is a certain number of measuring points along the height profile, each of which generates its own measured value for the distance.

In the case of film thickness measurement in the solar radiation receiver, a profile scanner can be held in the container by means of a holder and a height profile of the particle film can be measured along the longitudinal axis of the container, also known as the receiver. This height profile is initially only a 2D profile. If the container now also rotates and the measurement of the previously measured height profile is continuously repeated, a 3D height profile of the film of the heat transfer medium is created.

In the case of a perfect cylinder, the thickness of the particle film could be calculated from the 3D height profile and the determined distance of the profile scanner to the inner wall of the receiver. However, since the container is not a perfect cylinder, the measurement of the 3D profile alone does not provide any information about the actual thickness of the particle film.

In order to determine this thickness, a reference measurement of the empty container without heat transfer medium can also be carried out. The inner wall of the container, also referred to as the inliner, is measured in the same way as the film of the heat transfer medium on the inner wall and a 3D height profile of the inner wall is created. The two height profiles can then be subtracted from one another. The result is the actual thickness of the film of the heat transfer medium.

In order to be able to correctly subtract the two height profiles from one another, information about the rotational position of the two height profiles or the respective measurement line in relation to this rotational position of the container is also required. The rotational position of the measurement line correlates closely with the rotational position of the container, in particular the rotational position of the measurement line can be equal to the rotational position of the container. This allows the measurement points of both height profiles to refer to the same real point in the container.

This information can be provided by the position transducer, also known as an encoder or encoder. This is a rotation angle sensor that can be used to determine the rotational position of the container.

This rotational position can be transferred to the profile scanner so that the individual measuring points along the respective measurement line can be saved with the information about the associated rotational position of the container. Alternatively or additionally, the rotational position of the container can be transferred to a computing device, which can accordingly assign the measurement points to the information about the rotational position and the height profile of the associated measurement line.

A transfer to the profile scanner can take place via an interface, for example via an RS-422 interface, which can be connected directly from the position transducer to the profile scanner. The measurement data on the rotational position can then be stored at the same time as the measurement data regarding the distance and can be transmitted to the computing device and processed.

The heat transfer medium can advantageously consist of or comprise particles, for example bauxite particles. The height profile is measured on a surface of a film of the heat transfer medium in the form of a particle bed. It turns out that even a porous bed with the absorptive material of the bauxite particles reflects enough light.

According to an advantageous embodiment of the measuring device, the measurement line can extend parallel to a longitudinal axis of the container. The measurement line consists of or comprises a number of individual measurement points along the length of the measurement line, in which the optical device determines the distance between the measurement object and the sensor for each measurement point, for example via a transit time measurement.

The profile scanner can have a variable measuring range transverse to the longitudinal axis in the direction of the surface normal of the inner wall of the container. The measuring range can be adjusted depending on how different the distances to be measured are, for example due to non circular running or eccentricity of the container. With small changes in distance, the measuring range can be very small. If there are larger differences, the range can be chosen larger, for example if the circularity is not perfect or if there is an eccentricity.

The measuring frequency of the profile scanner depends on the size of the measuring range. The smaller this range, the fewer measuring points have to be read out on the sensor and the faster measurements can be taken. Accordingly, it is desirable to keep this range small.

An eccentrically running, rotating component can be problematic, since the measuring range would actually have to be quite large in order to be able to detect everything precisely. This can be solved using software technology by evaluating the data from the position transducer, which can be connected to the profile scanner and/or to the computing unit, together with the data of the height profiles of the profile scanner.

In this case, a reference measurement can first be carried out in order to detect deviations in the circularity of the container. The information from the reference measurement can then be used to shift the measuring range according to the imperfect circularity of the container in the height profile. This has the advantage that the measuring range can be selected to be quite small, which results in a higher measuring frequency. Nevertheless, the distance information can be recognized with sufficient accuracy, since the measuring range is shifted according to the lack of roundness According to an advantageous embodiment of the measuring device, the position transducer can be coupled to the container, in particular attached to the container, and detect a rotational position of the container. In particular, the profile scanner can detect a rotational position of the container, which is supplied by the position transducer, synchronously with the projected measurement line. Alternatively or additionally, the position transducer can forward the rotational position to a computing unit, which combines the projected measurement line and the respective rotational position. The position transducer can advantageously have a magnetic tape that is placed around the container. In particular, the rotational position of the container can be determined using a magnetic tape with a number of magnetic poles, which are read out by a sensor of the position transducer that moves over the magnetic tape.

A container, in particular a particle receiver, for heating the heat transfer medium of a receiving device for solar radiation or a rotational kiln usually does not have a shaft around which the container can rotate. Rather, it is driven by a chain. Therefore, conventional position transducers cannot be used to determine the rotational position of the particle receiver. Advantageously, the rotational position can be determined by means of a magnetic tape placed around the container with a specific number of poles, which can be read by a sensor. This combination of sensor and magnetic tape can then be used to determine the rotational position of a shaftless container, in particular a particle receiver, with great accuracy.

It is particularly advantageous to use a combination of a magnetic tape placed around the container and a sensor arranged above it for detecting a rotational position of a shaftless rotating particle receiver in a solar thermal power plant or in a rotational kiln. The sensor may be placed at a fixed angular position with respect to the container. While the container rotates, the sensor does not rotate. The distance between the sensor and the magnetic tape is suitably between about 1 mm and about 3 mm. Optionally, the sensor can be mounted so that it can be moved radially in order to ensure an even distance to the receiver or the magnetic tape. This is advantageous if, for example, the container is not running circularly or is eccentric, or if the distances between the magnetic tape and the sensor can fluctuate.

According to an advantageous embodiment of the measuring device, a computing device can be coupled to the distance measuring device and/or the position transducer.

Advantageously, the computing device can carry out a corresponding assignment of the measuring points to the information about the rotational position of the container and the distance according to the height profile of the associated measurement line. In particular, in this case, height profile data from a measurement of the inner wall of the empty container without a heat transfer medium and from a measurement with a film of the heat transfer medium can be processed. The two height profiles can then be subtracted from one another. The result is the actual thickness of the film of the heat transfer medium.

According to an advantageous configuration of the measuring device, the distance measuring device can protrude into the container on a holder. In particular, a plurality of the optical devices of the distance measuring device can protrude into the container on a holder. If the distance measuring device has only one optical device, in particular in the form of a profile scanner, this can be arranged to be displaceable along and/or with the holder so that the container can be measured over its entire length.

If the distance-measuring device has a plurality of optical devices, in particular in the form of profile scanners, their number can expediently be selected such that the entire axial extent of the container can be detected with adjacent measurement lines.

According to a further aspect of the invention, a method is proposed for determining a distribution of heat transfer medium on an inner wall of a shaftless container that rotates when used as intended, in particular in which the heat transfer medium of a receiver device for solar radiation in a solar thermal power plant or a rotational kiln is heated, by means of a measuring device, which comprises at least one optical device for detecting at least one height profile along at least one measurement line projected onto the inner wall and at least one position transducer for determining a current rotational position of the respective measurement line on the inner wall.

The distance measuring device detects at least one height profile along at least one measurement line projected onto the inner wall using the at least one optical device, and the at least one position transducer determines a current rotational position of the container and thus the rotational position of the respective measurement line on the inner wall.

According to an advantageous embodiment of the method, a rotational position of the two height profiles with and without a heat transfer medium on the inner wall of the container can be determined in relation to a rotational position of the container. As a result, the film thickness of the heat transfer medium on the inner wall of the container can be determined with precise positioning by subtracting the data.

According to an advantageous embodiment of the method, the distance can be measured without solar radiation entering the container. Conventional components that do not tolerate high temperatures can advantageously be used.

According to an advantageous embodiment of the method, a difference between the distance data of the film and the distance data of the inner wall can be formed and from this a location-dependent distribution of the film of the heat transfer medium on the inner wall of the container can be determined. As a result, reliable measured values can be provided.

According to an advantageous embodiment of the method, a measuring frequency of the position transducer can be adapted to a length of the measurement line in the direction of the longitudinal axis of the container. As a result, an exact measurement can be carried out even in the case of larger changes in distance, namely in the case of a profiled surface with a correspondingly pronounced height profile.

According to an advantageous embodiment of the method, a reference measurement can be carried out to determine an eccentricity and/or lack of circularity of the container and a length of the measurement lines can be adjusted in the direction of the longitudinal axis of the container. The determination of the distribution of heat transfer medium on the inner wall of the container can advantageously be adapted to the actual state of the container.

According to an advantageous embodiment of the method, the determination of the distribution of heat transfer medium on the inner wall can be carried out repeatedly and changes in the distribution can be detected. This allows a reliable quality check to be carried out during the service life of the solar radiation receiver.

According to an advantageous embodiment of the method, a maintenance requirement can be indicated if permissible tolerances of the changes are exceeded. Timely maintenance or repair can favorably enable reliable operation of the solar radiation receiver.

According to a further aspect of the invention, a use of a measuring device is proposed for determining a distribution of a heat transfer medium on an inner wall of a container which is designed to heat the heat transfer medium with concentrated solar radiation in a solar thermal power plant, comprising a distance measuring device for determining a thickness of a film of the heat transfer medium on the inner wall of the container, wherein the distance measuring device comprises at least one optical device for detecting at least one height profile along at least one measurement line projected onto the inner wall and at least one position transducer for determining a current rotational position of the respective measurement line on the inner wall, wherein the position transducer has a combination of a magnetic tape and a sensor arranged thereabove for detecting a rotational position of the shaftless rotating container.

The container is in particular a particle receiver, also known as a centrifugal receiver, in a solar thermal power plant. Optionally, the combination can also be used to detect a rotational position of a rotational kiln.

According to an advantageous embodiment, the magnetic tape can be arranged on the container and can rotate with the container, while the sensor is arranged above the magnetic tape. The magnetic tape can surround the container, in particular on the outer circumference, and the sensor can be arranged at a small radial distance from it. The sensor may be placed at a fixed angular position with respect to the container. While the container rotates, the sensor does not rotate. The distance between the sensor and the magnetic tape is suitably between about 1 mm and about 3 mm. Optionally, the sensor can be mounted so that it can be moved radially in order to ensure an even distance to the receiver or the magnetic tape. This is advantageous if, for example, the container is not running circularly or is eccentric, or if the distances between the magnetic tape and the sensor can fluctuate.

Optionally, the magnetic tape can also be arranged on the inside, in particular on the inner wall, of the container and the sensor can be arranged correspondingly inside the container at a small radial distance from it.

According to an advantageous embodiment, the magnetic tape can be arranged on the container and can rotate with the container, while the magnetic sensor is arranged above the container or magnetic tape. The sensor can be arranged on the outside of the container, in particular on the outer circumference, and the magnetic tape can be arranged at a small radial distance from it. Optionally, the magnetic tape can also be arranged on the inside, in particular on the inner wall, of the container and the sensor can be arranged correspondingly inside the container at a small radial distance from it.

Optionally, the two alternative embodiments can also be combined on one container, wherein the measuring accuracy can be increased by two such combinations of sensor and magnetic tape.

According to a further aspect of the invention, use of a combination of a magnetic tape and a sensor arranged above it is proposed for detecting a rotational position of a shaftless rotating container. The container is in particular a particle receiver, also known as a centrifugal receiver, in a solar thermal power plant. Optionally, the combination can also be used to detect a rotational position of a rotational kiln.

According to an advantageous embodiment, the magnetic tape can be arranged on the container and can rotate with the container, while the sensor is arranged above the magnetic tape. The sensor may be placed at a fixed angular position with respect to the container. While the container rotates, the sensor does not rotate. The distance between the sensor and the magnetic tape is suitably between about 1 mm and about 3 mm. Optionally, the sensor can be mounted so that it can be moved radially in order to ensure an even distance to the receiver or the magnetic tape. This is advantageous if, for example, the container is not running circularly or is eccentric, or if the distances between the magnetic tape and the sensor can fluctuate.

The magnetic tape can surround the container, in particular on the outer circumference, and the sensor can be arranged at a small radial distance from it. Optionally, the magnetic tape can also be arranged on the inside, in particular on the inner wall, of the container and the sensor can be arranged correspondingly inside the container at a small radial distance from it.

According to an advantageous embodiment, the sensor can be arranged on the container and can rotate with the container, while the magnetic sensor is arranged above the sensor. The sensor can be arranged on the outside of the container, in particular on the outer circumference, and the magnetic tape can be arranged at a small radial distance from it. Optionally, the magnetic tape can also be arranged on the inside, in particular on the inner wall, of the container and the magnetic tape can be arranged inside the container at a small radial distance from it.

Optionally, the two alternative configurations can also be combined on one container, wherein the measuring accuracy can be increased by two such combinations of sensor and magnetic tape.

BRIEF DESCRIPTION OF THE DRAWINGS

Further advantages will be apparent from the following description of the drawings. Exemplary embodiments of the invention are shown in the figures. The figures, the description, and the claims contain numerous features in combination. A person skilled in the art will expediently also consider the features individually and combine them into further meaningful combinations.

In the Exemplary Figures.

DETAILED DESCRIPTION

In the figures, identical or identically acting components are identified by the same reference signs. The figures only show examples and are not to be understood as limiting.

Before the invention is described in detail, it should be pointed out that it is not limited to the respective components of the device and the respective method steps, since these components and methods can vary.

The terms used herein are only intended to describe particular embodiments and are not used in a limiting manner. Furthermore, if the singular or indefinite articles are used in the description or in the claims, this also applies to the plural of these elements, unless the overall context clearly indicates otherwise.

The directional terminology used in the following with terms such as "left", "right", "above", "below", "in front of", "behind", "after", and the like only serves for better comprehension of the figures and is in no way intended to restrict the generality. The components and elements shown, their design and use can vary according to the considerations of a person skilled in the art and can be adapted to the respective applications.

Figure 1:
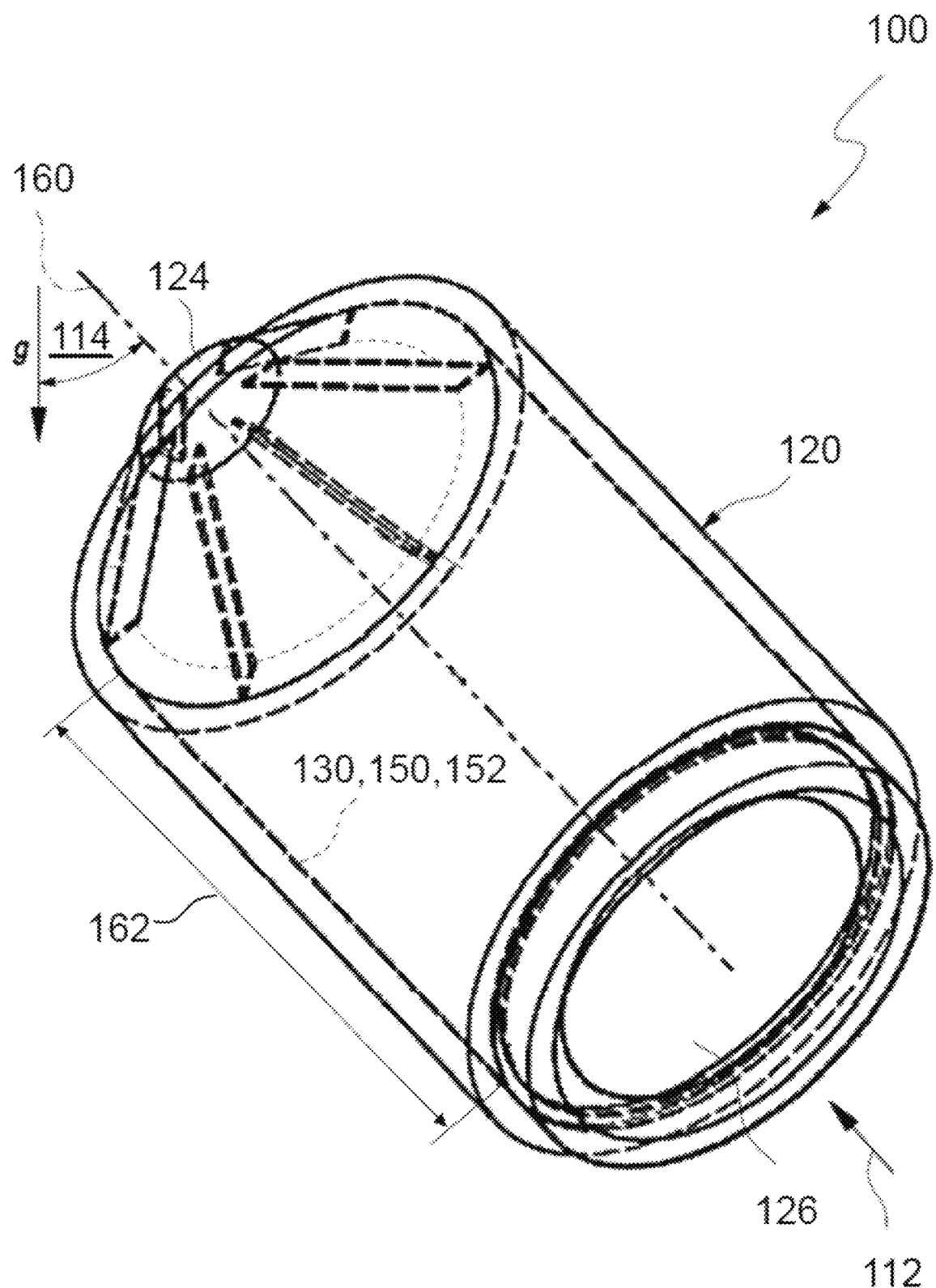
FIG. 1 shows an exemplary embodiment of a container of a solar radiation receiver which is driven by a chain.

FIG. 1 shows an exemplary embodiment of a container 120 of a solar radiation receiver 100 which is driven by a chain (not shown).

The container 120 is double-walled and has an inner wall 130 on which a film 152 of a heat transfer medium 150, for example bauxite particles, moves through the container 120 during intended operation. Along the axial extent 162 of the container 120, the film 152 is strongly heated by the solar radiation 112 entering through the aperture 126 for radiation input. The heat transfer medium 150 is fed in, for example, via the medium inlet 124 on the opposite side of the container 120 in a manner known per se and is distributed by the rotation of the container 120 on its inner wall 130.

The longitudinal axis 160 of the container 120 can be inclined at an angle 114 with respect to gravity g.

In order to determine the thickness of the film 152, a distance measuring device 10 is used, which comprises at least one optical device 30 with a transmitter 32 and a receiver 34. The optical device 30 is advantageously designed as a profile scanner, with which a measurement line 40 (FIG. 2) is directed onto the object to be measured, for example the inner wall 130 with or without film 152.

Figure 2:
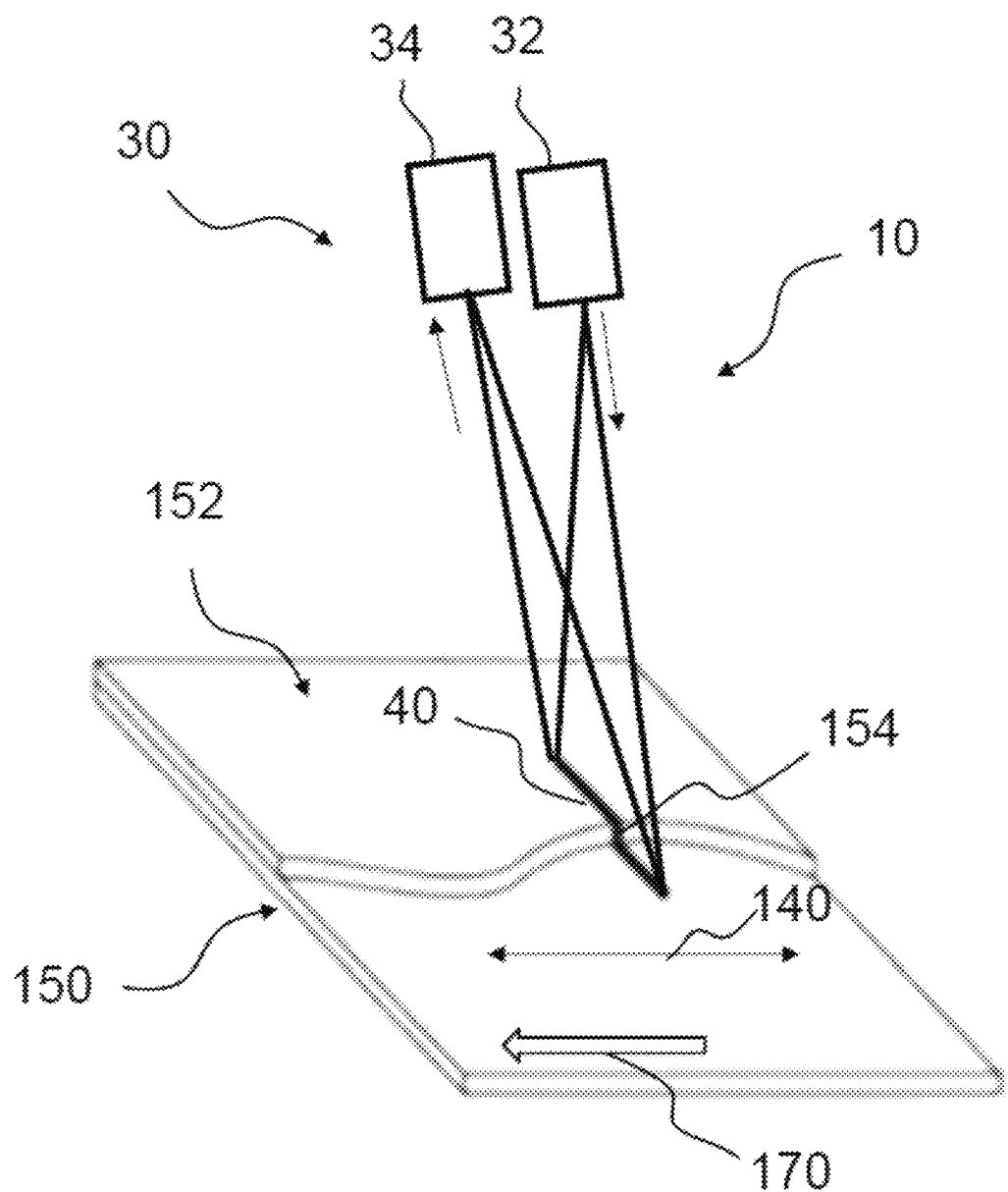
FIG. 2 shows a schematic representation of a detection of a height profile on a measurement line.
Figure 3:
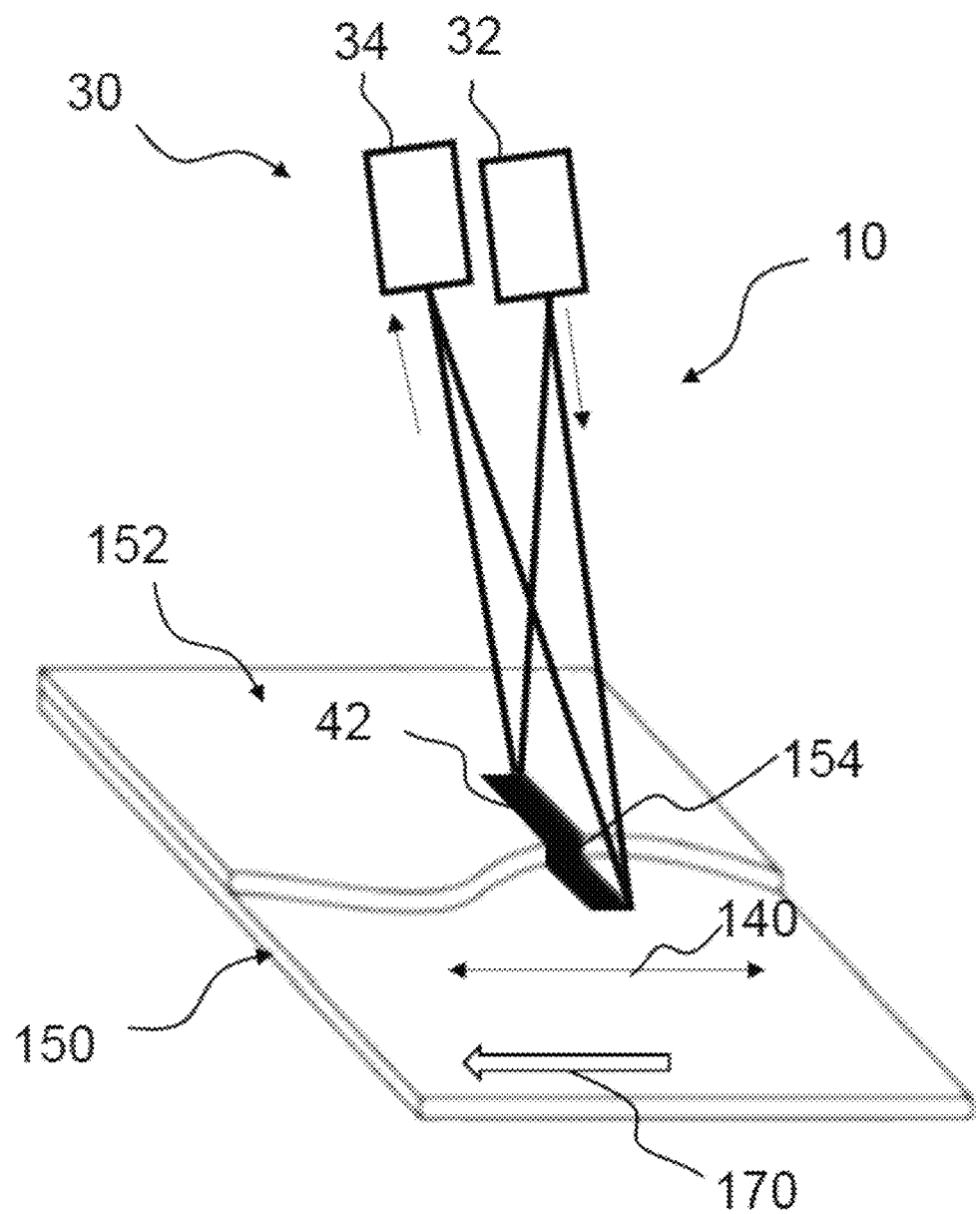
FIG. 3 shows a schematic representation of a detection of a height profile in a region of successive measurement lines in a circumferential direction according to FIG. 2.

FIG. 2 shows a schematic representation of the detection of a height profile by a distance measuring device 10 on a measurement line 40, while FIG. 3 shows a schematic representation of the detection of a height profile on a region 42 of measurement lines 40 following one another in a circumferential direction 140 in accordance with FIG. 2.

The transmitter 32 is conveniently a laser and the receiver 34 is conveniently an electronic camera. The transmitter 32 of the optical device 30 radiates a laser beam onto the inner wall 150, and the receiver 34 measures at points along a measurement line 40 the distances between the optical device 30 and points on the measurement line 40.

During the measurement, the optical device 30 is rigidly mounted, while the container 120 can move in the direction of rotation 170 under the measurement line 40. If the measurement line 40 or the region 42 of measurement lines 40 is positioned above a step in the film 152, the height difference 154 is detected, so that a height profile can be detected with the measurement line 40.

A height profile of the inner wall 130 without the film 152 and a height profile of the inner wall 130 with the film 152 of heat transfer medium 150 can be detected. From the difference in values, the thickness of the film 152 can be determined. A rotational position of the container 120 is determined for each measurement line 40, so that the thickness of the film 152 can be determined with positional precision.

Figure 4:
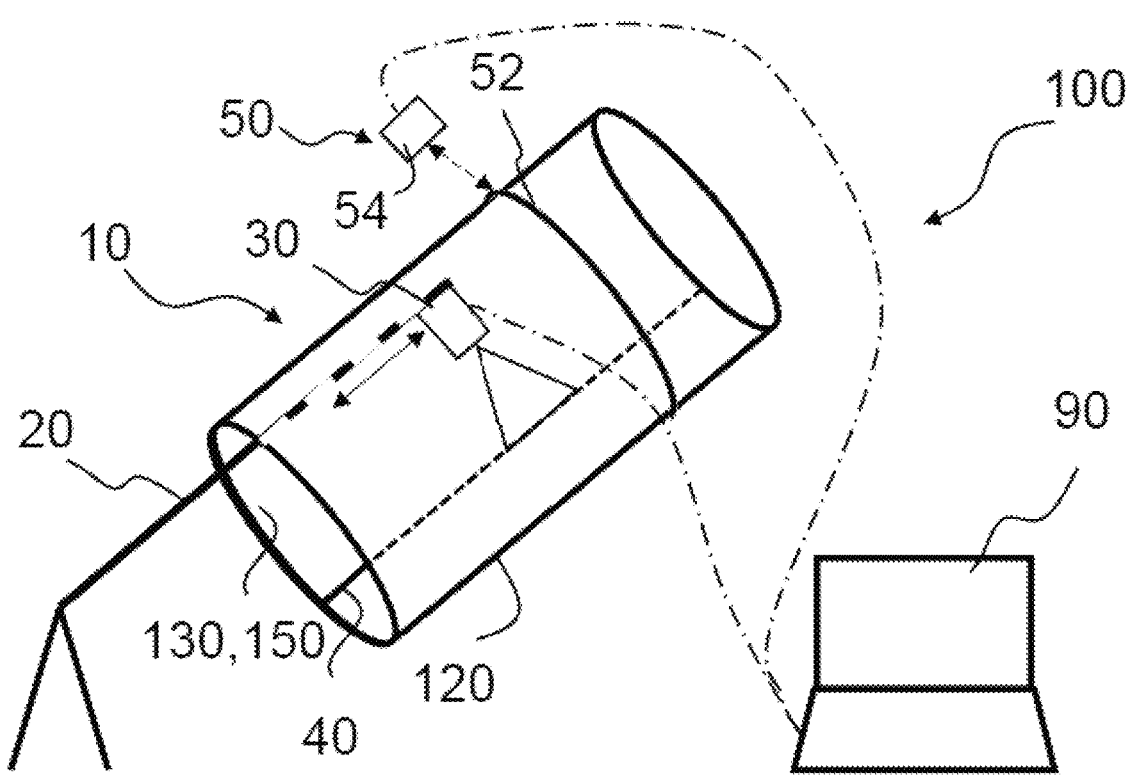
FIG. 4 shows a measuring device according to an exemplary embodiment of the invention, in which a distance measuring device has a displaceable optical device.

FIG. 4 shows a measuring device 100 according to an exemplary embodiment of the invention, in which a distance measuring device 10 has an optical device 30 that can be displaced on or with a holder 20.

The distribution of heat transfer medium 150 on the inner wall 130 of the container 120 can be determined with the measuring device 100. The measuring device 100 comprises the distance measuring device 10, which in this exemplary embodiment comprises an optical device 30 for detecting at least one height profile along at least one measurement line 40 projected onto inner wall 130, and at least one position transducer 50 for determining a current rotational position of the respective measurement line 40 on the inner wall 130 with respect to the rotational position of the container 120.

The measurement line 40 extends parallel to a longitudinal axis 160 of the container 120. If the container 120 rotates, adjacent measurement lines 40 form a region 42, as schematically shown in FIG. 3.

The position transducer 50 is attached to the container 120 and detects the rotational position of the container 120, in particular synchronously with the projected measurement line 40 in a measuring position. The position transducer 50 can forward the position values to the distance measurement device 10 or, as indicated in the figure, to a computing device 90, which links the distance measurement values and the position values.

Figure 5:
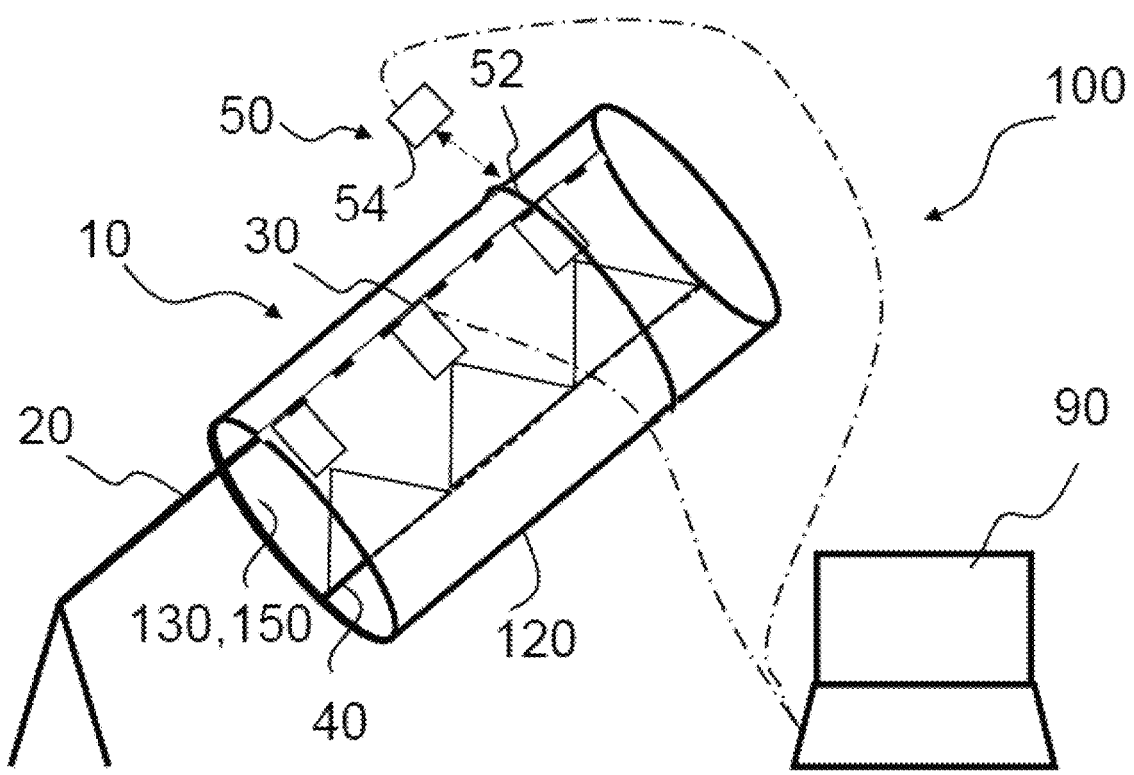
FIG. 5 shows a measuring device according to an exemplary embodiment of the invention, in which a distance measuring device has a plurality of optical devices.

It goes without saying that the measured values can be transmitted from the position transducer 50 to the optical device 30 and/or to the computing unit 90, as indicated by dot-dashed lines in FIGS. 4 and 5, by wire via data cables or also wirelessly.

Since the container 120 cannot be driven by a shaft the angular position of which could be detected when the container 120 rotates, the position transducer 50 has a magnetic tape 52 which is placed around the container 120. In order to determine the rotational position, the magnetic tape 52 has a number of magnetic poles, which are read out by a sensor 54 of the position transducer 50.

In order to also detect the distribution of the heat transfer medium 150 on the entire inner wall 130 of the container 120 in the direction of the longitudinal axis 160, the optical device 30 can be shifted parallel to the longitudinal axis of the container 120 to a new measurement position.

FIG. 5 shows a measuring device 100 according to an exemplary embodiment of the invention, in which, in contrast to the exemplary embodiment in FIG. 4, a distance measuring device 10 has a plurality of optical devices 30, in this example three optical devices 30. The number of optical devices 30 can be advantageously selected such that their measurement lines 40 projected onto the inner wall 130 or the film 152 adjoin one another in the direction of the longitudinal axis 160 of the container 120 and cover the entire axial extension 162 thereof. The optical devices 30 can then remain at their respective measuring point when determining the distribution of the heat transfer medium 150 on the inner wall 130.

Figure 6:
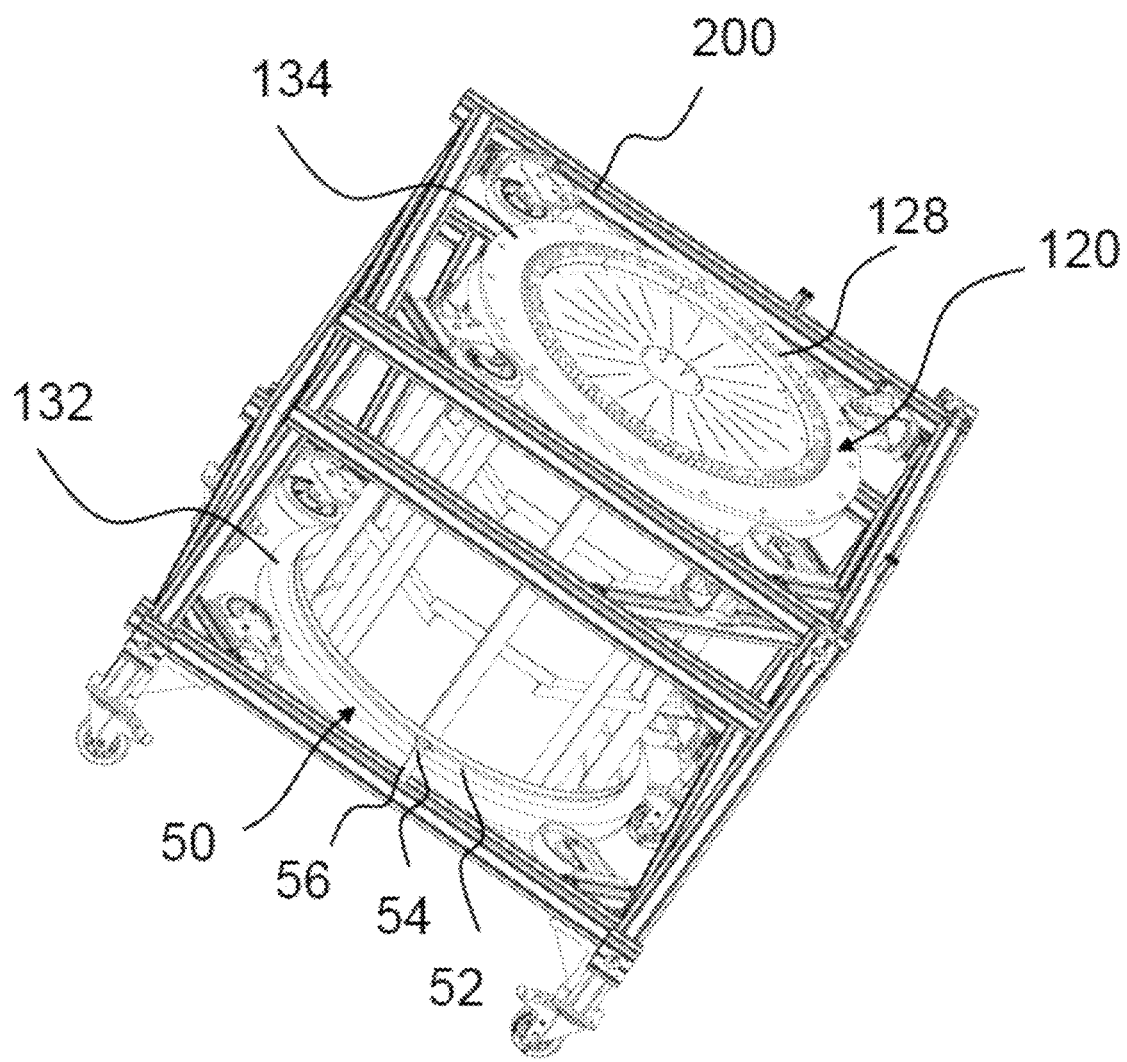
FIG. 6 shows a perspective view of a container in a framework with a position transducer on a container according to an exemplary embodiment of the invention.
Figure 7:
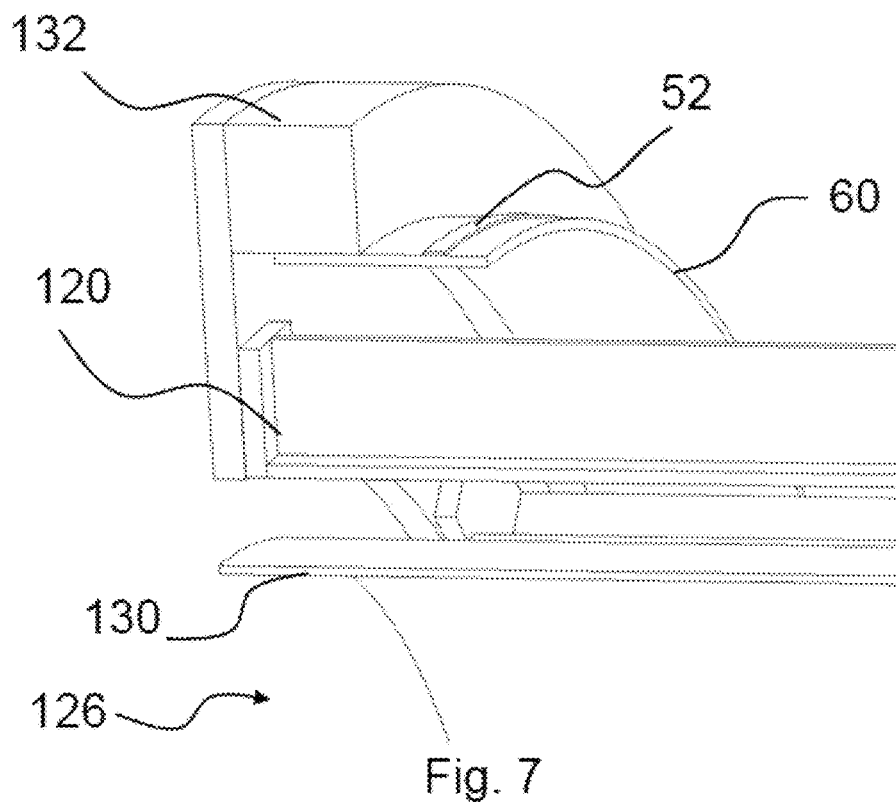
FIG. 7 shows a detailed view of an arrangement of a magnetic tape of the position transducer according to FIG. 6 on a bearing flange of the container.
Figure 8:
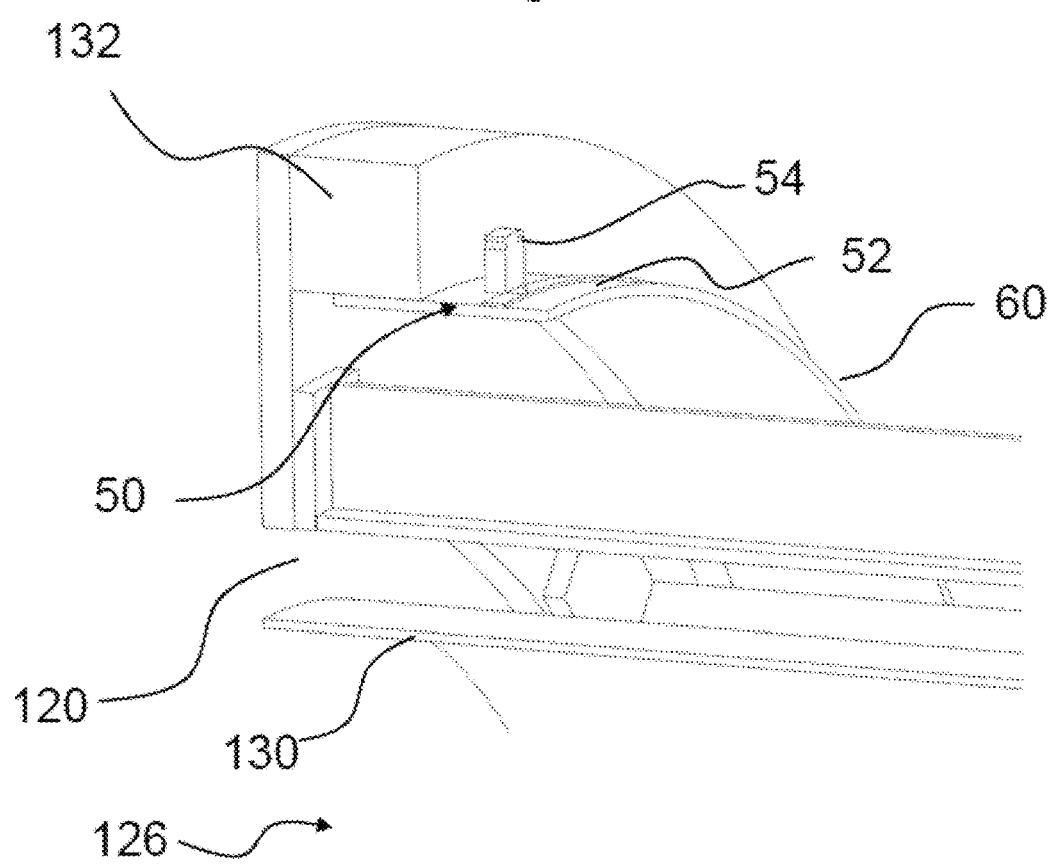
FIG. 8 shows a detailed view of an arrangement of the position transducer with sensor and magnetic tape according to FIG. 6.

FIG. 6 shows a perspective view of a container 120 in a framework 200 with a position transducer 50 on the container 120 according to an exemplary embodiment of the invention. FIG. 7 shows a detailed view of an arrangement of a magnetic tape 52 of the position transducer 50 according to FIG. 6 on a bearing flange 132 of the container 120. FIG. 8 shows a detailed view of an arrangement of the position transducer 50 with sensor 54 and magnetic tape 52 according to FIG. 6.

The container 120 has no shaft for the rotation of the container 120 during normal operation. The container 120 is driven, for example, by a chain drive, for which purpose the container 120 in this example has a flange 134 with a crown gear 136, into which a chain (not shown) can engage in order to rotate the container 20. A bearing flange 132 is arranged on the container 120 at an axial distance therefrom.

The container 120 is mounted and guided in the framework 200 by the bearing flange 132. For example, the container 120 has the bearing flange 132 at one axial end and the flange 134 with the crown gear 136 at the opposite axial end.

The magnetic tape 52 can be arranged on the bearing flange 132 of the container 120 with which the container 120 is supported in the framework 200.

The magnetic tape 54 can be fastened to the bearing flange 132 on an outer side of a suitably bent holding sheet plate 60, for example made of aluminum, and enclose the container 120 on its outer side. The holding sheet plate 60 can be arranged, for example, in a free space on the inside of the bearing flange 132.

The holding sheet plate 60 can consist of or comprise individual parts that are bent on a bending machine. The holding sheet plate 60 can then be fastened to the inside of the bearing flange 132, for example by gluing. Then the magnetic tape 52 can be fastened to the holding plate 60, for example by gluing, or fixed with a tightening strap or in another suitable manner.

The sensor 54 is mounted at a small distance from the magnetic tape 52. An advantageous distance is in particular between 1 mm and 3 mm. For this purpose, the sensor 54 can be arranged on a holding arm 56 which points towards the magnetic tape 52 and is fixed to the framework 200 (FIG. 6). In this way, the sensor 54 can be positioned in a stable and reproducible manner in relation to the magnetic tape 52.

The connections of holding arm 56 and sensor 54 to the framework 200 can advantageously be detachable and can be designed, for example, as screw connections.

Figure 9:
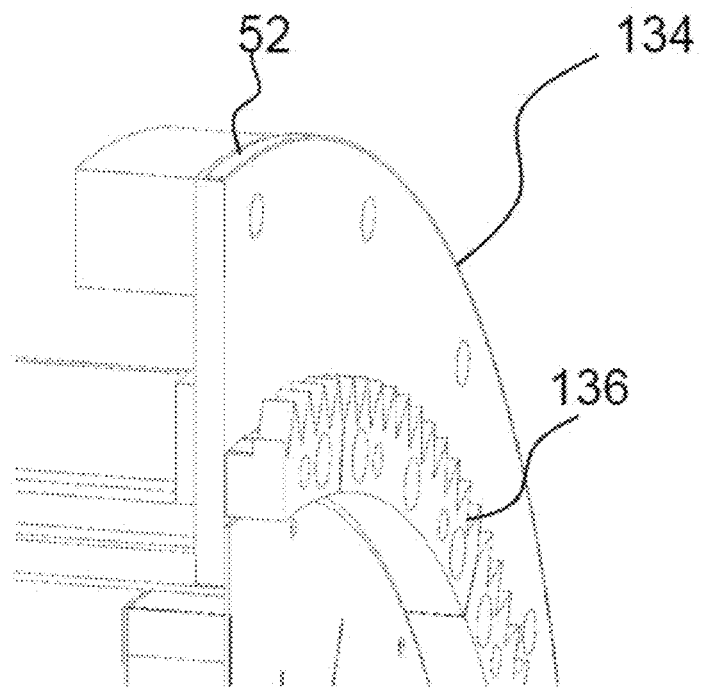
FIG. 9 shows a detailed view of a magnetic tape of a position transducer on a flange of a container according to an exemplary embodiment of the invention.
Figure 10:
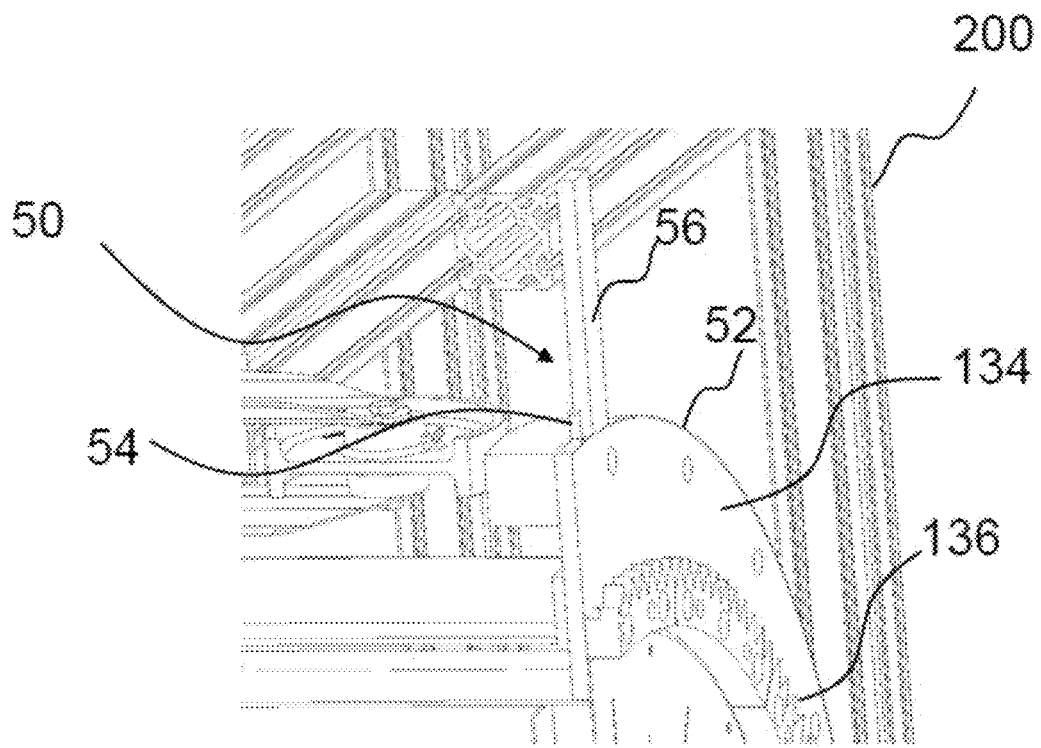
FIG. 10 shows a detailed view of the position transducer on a flange of a container according to FIG. 9.

FIG. 9 shows a detailed view of a magnetic tape 52 of a position transducer 50 on a drive flange 134 of a container 120 according to an exemplary embodiment of the invention. FIG. 10 shows a detailed view of the position transducer 50 on the drive flange 134 of the container 120 according to FIG. 9.

The drive flange 134 is part of the container 120 itself. In this embodiment, the magnetic tape 52 is attached to the outside of the drive flange 134, for example by gluing.

The sensor 54 is mounted at a small distance from the magnetic tape 52. An advantageous distance is in particular between 1 mm and 3 mm. For this purpose, the sensor 54 can be arranged on a holding arm 56 which points towards the magnetic tape 52 and which is fixed to the framework 200 (FIG. 10). In this way, the sensor 54 can be positioned in relation to the magnetic tape 52 in a stable and reproducible manner.

The connections of the holding arm 56 and the sensor 54 to the frame 200 can advantageously be detachable and can be designed, for example, as screw connections.

It goes without saying that the magnetic tape 52 can also be arranged at a different location on the container 120.

Figure 11:
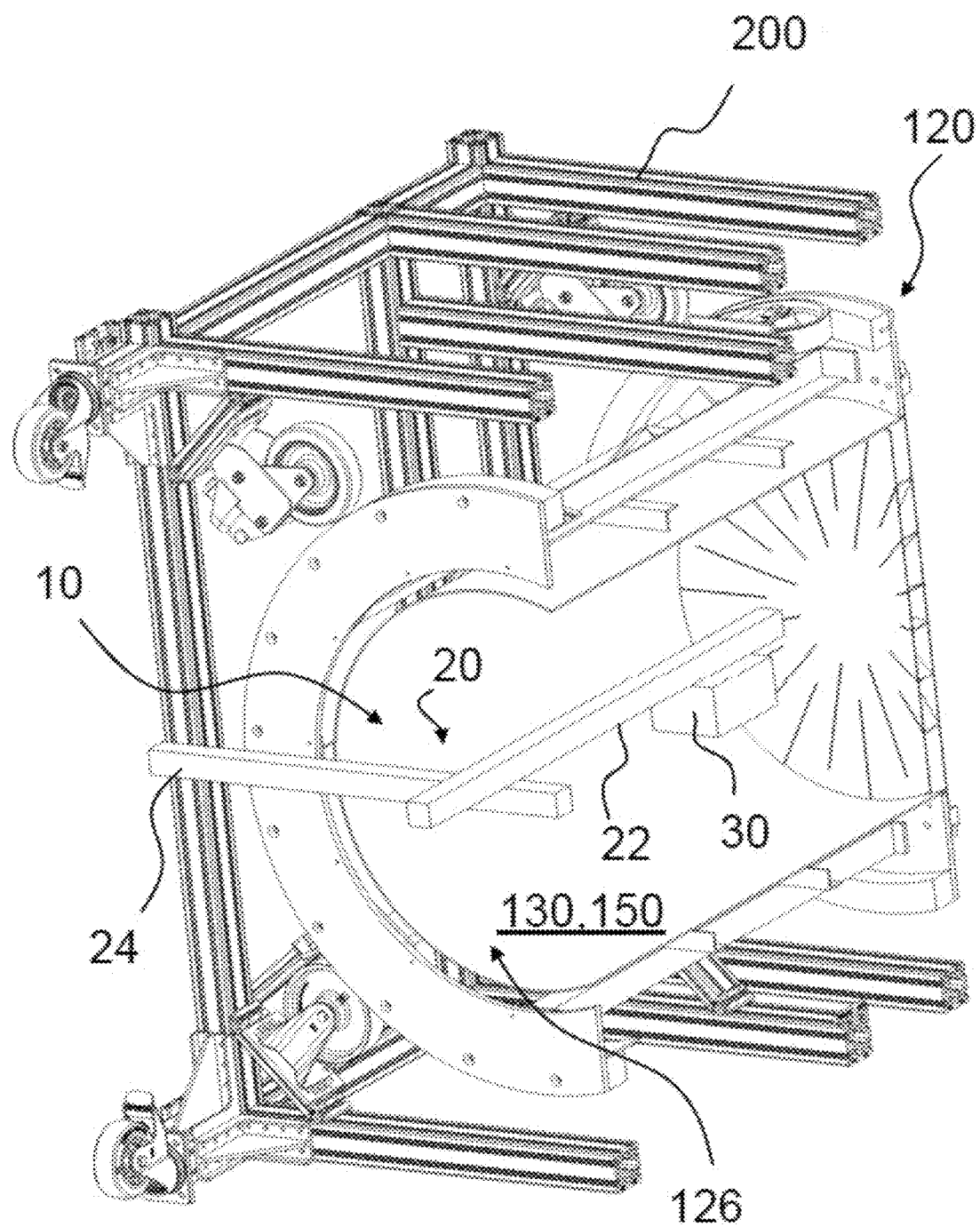
FIG. 11 shows, in a cut-away perspective view, a container in a framework with an optical device on a holder according to an exemplary embodiment of the invention.

FIG. 11 shows a cut-out perspective view of a container 120 in a framework 200 with an optical device 30 of a distance measuring device 10 on a holder 20 according to an exemplary embodiment of the invention.

The holder 20 protrudes into the interior of the container 120 with an arm 22 pointing in the axial direction of the container 120. The optical device 30 is fastened to the arm 22, for example by screwing, tying, clamping or the like.

The arm 22 is attached to a crossbeam 24 located in front of the aperture 126 of the container 120 and attached to the framework 200. Typically, during the operation of the container 120, solar radiation is directed into the container 120 through the aperture 126.

In particular, the crossbeam 24 can extend from one side of the framework 200 to the other side and cover the aperture 126.

The optical device 30 can be arranged to be displaceable along the arm 22. Alternatively or additionally, the arm 22 can be arranged to be displaceable on the crossbeam 24.

Alternatively or additionally, the arm 22 can also be designed as a telescopic arm.

All connections of the arm 22 are expediently designed as detachable connections, so that the aperture 126 can be freed again after the measurements.

Figure 12:
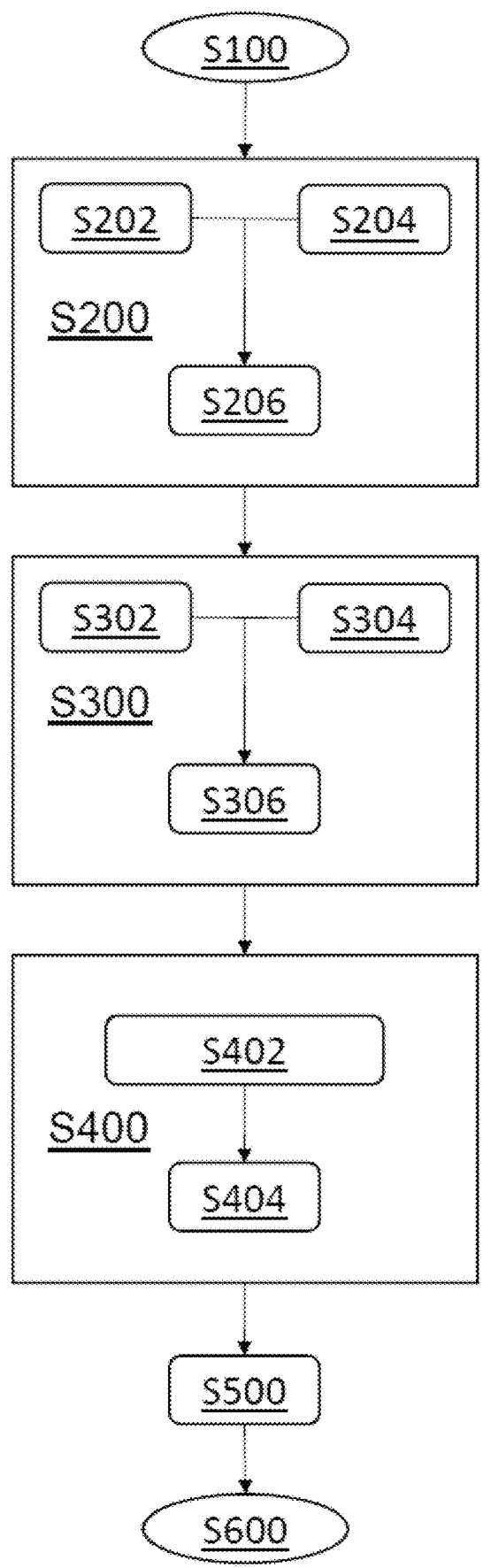
FIG. 12 shows a flow chart for carrying out a method according to an exemplary embodiment of the invention.

FIG. 12 shows a flow chart for carrying out a method according to an exemplary embodiment of the invention.

The method for determining a distribution of heat transfer medium 150 on an inner wall 130 of a container 120 starts with step S100.

In a first sequence S200, a first measurement takes place, in which the inner wall 130 of the container 120 is measured. In step S202, the optical device 30 of the distance measuring device 10 measures the distances between the optical device 30 and points on the measurement line 40 on the inner wall 130, point by point along a measurement line 40, while the position transducer 50 measures the rotational position of the container 120 (step S204). A first three-dimensional point cloud is generated in step S206 by linking distance and rotational position. The respective distance in relation to the respective measurement line 40 results in a height profile of the inner wall 130 both in the direction of the longitudinal axis 160 of the container 120 and, since the container 120 rotates, in the circumferential direction 140.

A second measurement takes place in a second sequence S300, in which the film 152 of the heat transfer medium 150, which is distributed on the inner wall 130, is measured. In step S302, the optical device 30 of the distance measuring device 10 measures the distances between the optical device 30 and points on the measurement line 40 on the film 152, point by point along a measurement line 40, while the position transducer 50 measures the rotational position of the container 120 (step S304).

A further three-dimensional point cloud is generated in step S306 by linking distance and rotational position. The respective distance in relation to the respective measurement line 40 results in a height profile of the film 152 on the inner wall 130 both in the direction of the longitudinal axis 160 of the container 120 and, since the container 120 rotates, in the circumferential direction 140.

It goes without saying that the measurement on the inner wall 130 can also be carried out after the measurement on the film 152, so that the two sequences S200 and S300 can be swapped.

In step S402, in sequence S400, a difference between the distance from the measurement on the inner wall 130 of the container 120 without heat transfer medium 150 and the distance from the measurement on the film 152 on the inner wall 130 is formed for each measuring point. In step S404 a corrected point cloud is provided.

After sequence S400, in step S500, measured values for the thickness of the film 152 corresponding to the distribution of the heat transfer medium 150 on the inner wall 130 are provided at a defined number of measuring points. The thickness of the film 152 or the distribution of the heat transfer medium 150 on the inner wall 130 can be determined with high spatial resolution.

The method ends in step S600.

The distance measurements are made without solar radiation entering the container 120. The measurements are expediently carried out at comparable temperatures.

Furthermore, corrections can be made during a reference measurement and during the measurement on the film 152 if the container 120 has deviations from circularity and/or an eccentricity. In particular, the measurement lines 40 can be adapted.

The determination of the distribution of heat transfer medium 150 on the inner wall 130 can be carried out repeatedly at time intervals for quality control and any changes in the distribution can be detected. If permissible tolerances of the changes are exceeded, a maintenance requirement can be indicated.

LIST OF REFERENCE NUMERALS 10 distance measuring device
20 holder
22 arm
24 crossbeam
30 optical device 32 transmitter
34 receiver
40 measurement line
42 region
50 position transducer
52 magnetic tape
54 sensor
56 arm
60 holding sheet plate
90 computing device
100 receiver device
112 solar radiation
114 angle
120 container
122 housing
124 medium inlet
126 aperture
130 inner wall
132 bearing flange
134 drive flange
136 crown gear
140 circumferential direction
150 heat transfer medium
152 film
154 height difference
160 longitudinal axis
162 axial extent
170 direction of rotation
200 framework

The invention claimed is:

1. A measuring device for determining a distribution of a heat transfer medium on an inner wall of a shaftless container which rotates when used as intended and which is designed in particular to heat the heat transfer medium with concentrated solar radiation in a solar thermal power plant or as a rotary kiln, comprising a distance measuring device for determining a thickness of a film of the heat transfer medium on the inner wall of the container,
   wherein the distance measuring device has at least one optical device for detecting at least one height profile along at least one measurement line projected onto the inner wall and
   at least one position transducer for determination of a current rotational position of the respective measurement line on the inner wall.

2. The measuring device according to claim 1, wherein the distance measuring device is designed to detect distance data directly on the inner wall of the container along the measurement line in order to create the height profile.

3. The measuring device according to claim 1, wherein the distance measuring device is designed to detect distance data directly on the film of the heat transfer medium on the inner wall of the container along the measurement line in order to create the height profile.

4. The measuring device according to claim 1, wherein the measurement line extends parallel to a longitudinal axis of the container.

5. The measuring device according to claim 1, wherein the position transducer is attached to the container and detects a rotational position of the container, in particular synchronously with the projected measurement line.

6. The measuring device according to claim 5, wherein the position transducer has a magnetic tape which is placed around the container, in particular wherein the rotational position is determined via a magnetic tape comprising a number of magnetic poles which are read out by a sensor of the position transducer.

7. The measuring device according to claim 1, wherein a computing device is coupled to the distance measuring device and/or the position transducer.

8. The measuring device according to claim 1, wherein the distance measuring device protrudes into the container on a holder.

9. A method for determining a distribution of a heat transfer medium on an inner wall of a shaftless container that rotates when used as intended, in particular in which the heat transfer medium is heated with concentrated solar radiation in a solar thermal power plant or a rotary kiln, by means of a measuring device according to claim 1,
   wherein the distance measuring device detects at least one height profile along at least one measurement line projected onto the inner wall by means of at least one optical device and
   at least one position transducer determines a current position of the respective measurement line on the inner wall.

10. The method according to claim 9, wherein a position of the two height profiles with and without a heat transfer medium on the inner wall of the container is determined in relation to a rotational position of the container.

11. The method according to claim 9, wherein the distance measurement is carried out without solar radiation entering the container.

12. The method according to claim 9, wherein a difference between distance data of the film and distance data of the inner wall is formed and from this difference a position-dependent distribution of the film of the heat transfer medium on the inner wall is determined.

13. The method according to claim 9, wherein a measuring frequency of the position transducer is adapted to a length of the measurement line in the axial direction of the container.

14. The method according to claim 9, wherein a reference measurement is carried out to determine an eccentricity and/or lack of circularity of the container and a length of the measurement lines in the direction of the longitudinal axis of the container is adapted.

15. The method according to claim 9, wherein the determination of the distribution of heat transfer medium on the inner wall is carried out repeatedly and changes in the distribution are detected, in particular wherein a maintenance requirement display is indicated if permissible tolerances of the changes are exceeded.

16. Use of a measuring device for determination of a distribution of a heat transfer medium on an inner wall of a container which rotates when used to heat the heat transfer medium with concentrated solar radiation in a solar thermal power plant or in a rotary kiln, the measuring device comprising a distance measuring device for determination of a thickness of a film of the heat transfer medium on the inner wall of the container,
   detecting, using at least one optical device, at least one height profile along at least one measurement line projected onto the inner wall and
   determining, using at least one position transducer, a current rotational position of the respective measurement line on the inner wall, wherein the position transducer has a combination of a magnetic tape and a sensor for detecting a rotational position of the shaftless rotating container.

17. Use according to claim 16, wherein the magnetic tape is arranged on the container and rotates with the container, and the sensor is arranged above the magnetic tape.

18. Use according to claim 16, wherein the sensor is arranged on the container and rotates with the container and the magnetic tape is arranged above the sensor.

19. Use of a combination of a magnetic tape and a sensor arranged above it to detect a rotational position of a shaftless rotating container in a solar thermal power plant or a rotary kiln.

20. Use according to claim 19, wherein the magnetic tape is arranged on the container and rotates with the container and the sensor is arranged above the magnetic tape.

21. The method according to claim 19, wherein the sensor is arranged on the container and rotates with the container and the magnetic tape is arranged above the sensor.

* * * * *